Figure 7:
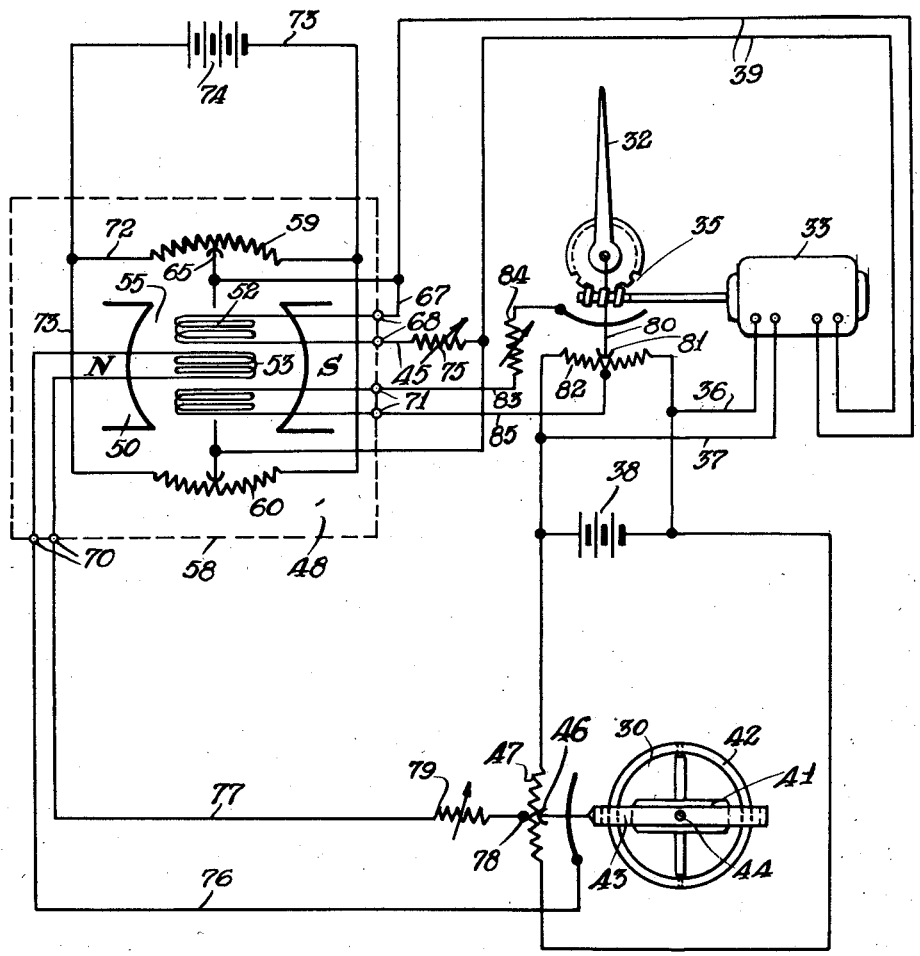

Sept. 4, 1945.    A. PATIN    2,383,942
AUTOMATIC ELECTRICAL CONTROL MEANS
Filed Feb. 15, 1943    3 Sheets-Sheet 1
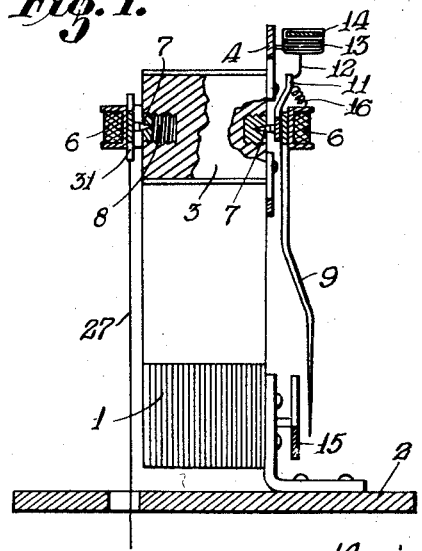
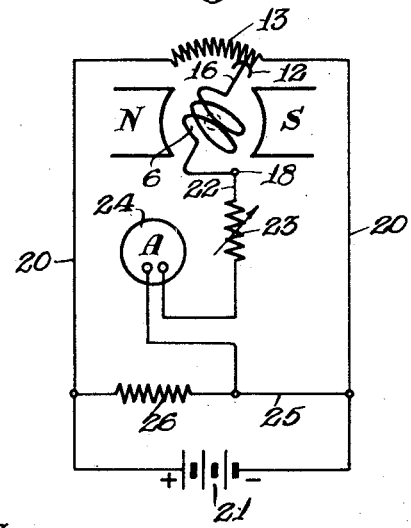
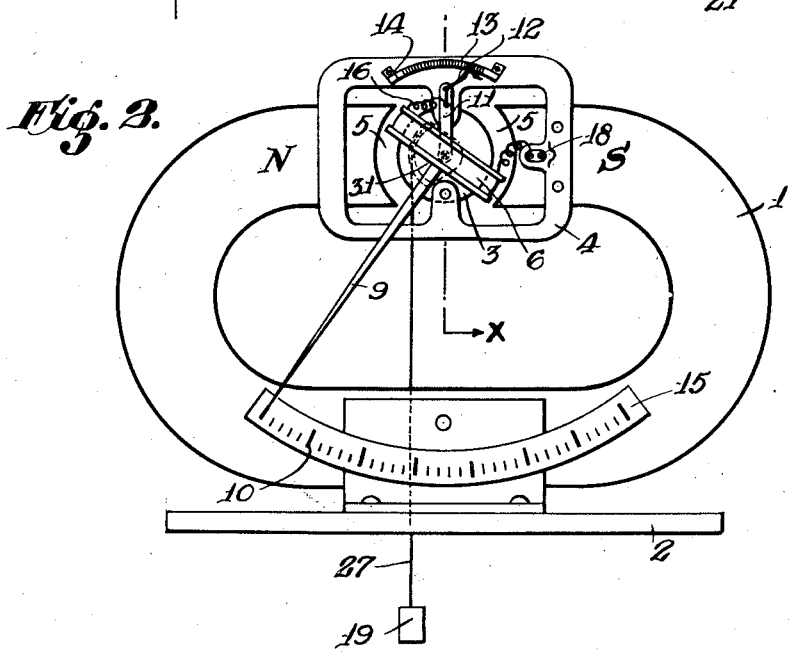
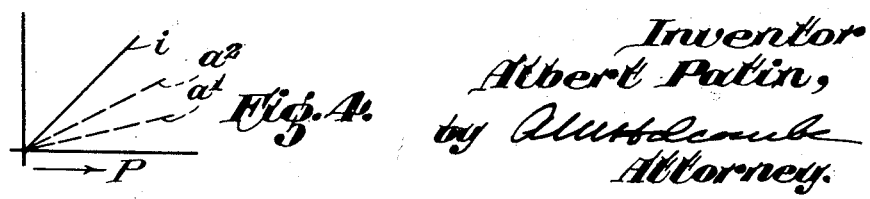
Inventor
Albert Patin,
by [signature]
Attorney.

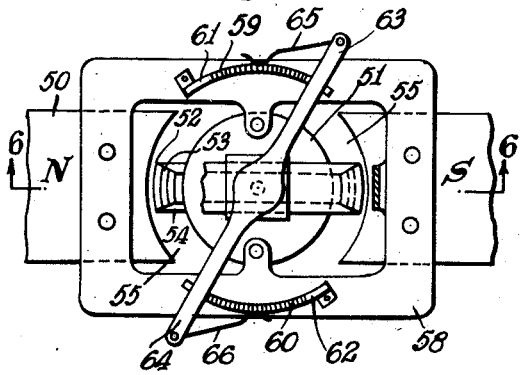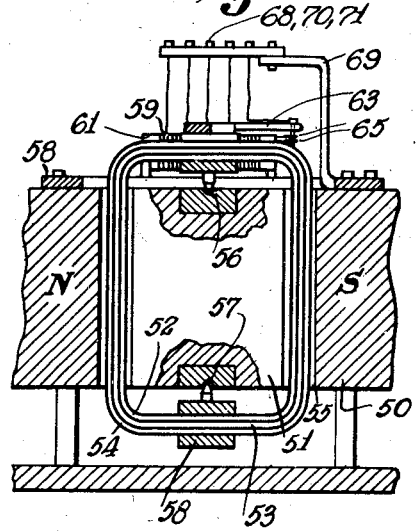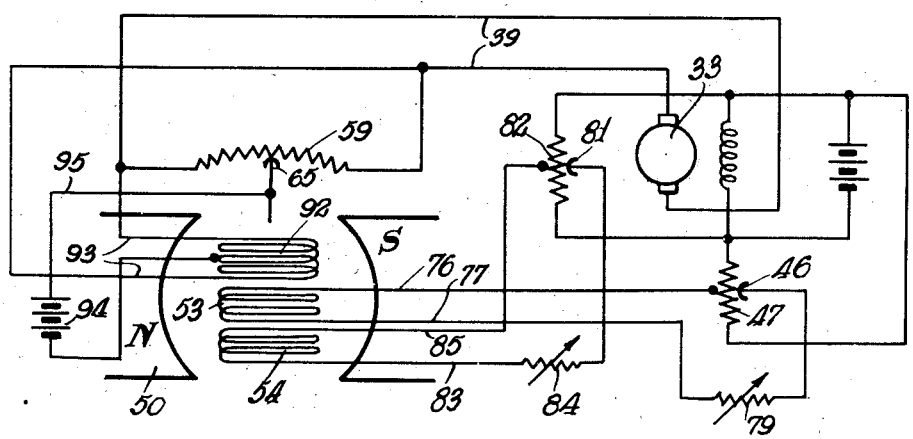

Sept. 4, 1945.   A. PATIN   2,383,942
AUTOMATIC ELECTRICAL CONTROL MEANS
Filed Feb. 15, 1943   3 Sheets-Sheet 3

Inventor:
Albert Patin,
by
Attorney.

Patented Sept. 4, 1945

2,383,942

UNITED STATES PATENT OFFICE 2,383,942

AUTOMATIC ELECTRICAL CONTROL MEANS

Albert Patin, Berlin, Germany; vested in the Alien Property Custodian

Application February 15, 1943, Serial No. 476,022
In Germany January 6, 1938

22 Claims. (Cl. 172—282)

My invention relates to improvements in electrical means for the automatic control of indicating, measuring, regulating, and steering apparatus, whereby a movable element or elements of such apparatus, having established initial positions, is or are automatically restored to such positions after deviation or departure therefrom.

An important object of the present invention is to provide control means of the character indicated, which is independent of outside or truant influences, and which is, therefore, accurate and reliable in operation.

Another important object of the present invention is to provide control means of the class indicated which may be readily adjusted to vary its directive force, even while the same is in use.

In general, the invention involves suitable forms of a device comprising magnet means, of either the permanent or of the electromagnetic types, affording a first magnetic field, an electromagnet consisting of a conductor, which when energized by an electric current produces a second magnetic field cooperating or interacting with said first magnetic field, said magnet means and said electromagnet being movable relative to each other under the influence of the force resulting from the interaction of the fields, together with current regulating means operated by and to the extent of such relative movement, a source of current, and a circuit including said electromagnet, said current regulating means, and said source of current in such relation that when said electromagnet and said magnet means are moved relatively to each other by an application of outside force, a current of electricity flows in the electromagnet and generates said second field. The first and second fields then interacting, cause the electromagnet to return to its initial position.

The present application is a continuation-in-part of my copending application Serial No. 268,641 for Magnetic device, filed April 18, 1939, and now abandoned.

For the purpose of explaining the invention several examples embodying the same have been shown in the accompanying drawings, in which the same reference characters have been used in all the views to indicate corresponding parts. In said drawings Fig. 1 is a sectional elevation of a device according to the invention and suitable for use as a dynamometer, Fig. 2 is a front elevation of Fig. 1, Fig. 3 is a wiring diagram showing the electrical circuits of the apparatus shown in Figs. 1 and 2, Fig. 4 is a diagram illustrating the operation of the apparatus shown in Figs. 1 to 3, Fig. 5 is a plan view showing a modified form of such apparatus, Fig. 6 is a fragmentary sectional elevation taken on the line 6—6 of Fig. 5, Fig. 7 is a diagram showing the electrical circuits of a system including the device shown in Figs. 5 and 6, and Fig. 8 is a diagram showing the electrical circuits of a modified system similar to that shown in Fig. 7.

In Figs. 1 to 3 is shown a device suitable for the control of a system for measuring forces or gravities. As shown, the device comprises a permanent magnet 1 supported on a base plate 2, a soft iron core 3 located between the poles N—S of the said magnet and fixed to a plate 4 secured to the magnet 1 and providing annular gaps between the core and the poles, and an electromagnet in the form of a coil 6 rotatably mounted coaxially of the core 3. The coil 6 is mounted by means of trunnions 7 in suitable bearings provided in the opposite ends of the core 3. To the coil 6 a hand 9 is secured which works on scale marks 10 on a segmental plate 15 fixed to the magnet 1. Further, an arm 11 is secured to the said coil 6 and carries a fine and exceedingly resilient spring contact 12 which is in sliding engagement with a resistance coil 13 of bare and closely wound wire placed on a carrier 14 mounted on the plate 4.

One end of the coil 6 is connected by a lead 16 with the spring contact 12. The opposite end of the coil 6 is connected by a flexible wire 17 with a terminal 18 secured to and insulated from the plate 4 and permitting free movement of the coil 6.

To the coil 6 a segmental disk 31 is secured which has a tension element 27 trained on its circumference to which is applied the external force to be measured, in this case the free pull of the weight 19.

The resistance coil 13 is included in a circuit 20 including a source of current such as a battery 21 (as shown in Figure 3). Leading from the terminal 18 is a conductor 22 in which are successively connected a resistance 23 and an ammeter 24. The conductor 22 is thereafter connected to a shunt conductor 25 connected to the circuit 20 at opposite sides of the battery 21, the conductor 25 including the resistance 26. Preferably the resistance 26 is substantially equal to the resistance 13.

The operation of the device is as follows:

When no external force is applied to the device the parts are in the positions shown in Figure 2. The spring contact 12 engages the resistance coil 13 at its right hand end, and the pointer 9 points to zero on the scale 10. The ends of the coil 6 being at the same potential, no current flows through the coil 6. If now an external force to be measured is applied to the tension element 27, the coil 6, the arm 11, and the pointer 9 are turned counter-clockwise in the direction of the arrow $x$ in Figure 2. By this rotary movement the spring contact 12 is made to slide on the resistance wire 13 toward the left, thereby reducing the potential of the lead 16 and of the lefthand terminal of the coil 6, as a result of which a current flows through the coil 6 and a magnetic field is produced which cooperates with the field of the permanent magnet, the coil 6 being wound so that the force produced by the interaction of the fields acts in opposition to the force exerted by the weight 19, until the current flowing through the coil 6 and the force produced thereby balance the moment exerted by the weight.

The angle through which the pointer 9 is turned is measures the force exerted by the gravity pull of the weight 19.

The coil 13 is uniformly wound so that the angular displacement of the pointer 7 is proportional to the force exerted by the weight.

I wish it to be understood that my invention is not limited to the construction shown herein in which the windings of the coil 13 and the scale marks are uniform. In some cases it may be desirable to provide a non-uniformly wound coil 13 in and in which the scale marks 10 are arranged accordingly. This may be desirable in order to permit more accurate measurements to be made in certain ranges.

The current flowing through the coil 6 and therefore the controlling force of the device may be varied or regulated by means of the variable resistance 23. Thereby the device may readily be set for measuring widely different forces.

The force exerted on the device is represented not only by the intensity of the magnetic field generated by the coil 6, but also by the current flowing through the said coil, and the potential difference at the ends of the coil. Therefore the said force may be measured not only by means of the pointer 9 and the scale marks 10, but also by the ammeter 24, which is valuable for the reason that the said ammeter may be located at a suitable place remote from the device. I have found that measuring by means of the ammeter 24 or a voltmeter connected to the ends of the coil 6 is more accurate than measuring by means of the pointer 9 and the scale marks 10, because the accuracy of the last-named measurement depends on the uniformity of the winding of the coil 13, while the said electrical values measured by the said ammeter 24 or the said voltmeter are proportional to the force exerted on the device even though the coil 13 has not been accurately wound.

The diagram shown in Fig. 4 illustrates the dependence of the angular movement of the pointer 9 and the current flowing through the coil 6 on the force 19 to be measured. The lines $a_1$ and $a_2$ show measurements made with different resistances 23, the line $a_1$ corresponding to a small resistance, and the line $a_2$ to a larger resistance 23.

The current $i$ made to flow through the coil 6 by a certain force is independent of the resistance 23. The diagram shows the values $a_1$ and $a_2$ corresponding to uniform winding of the resistance 13. If the winding of the said resistance is not uniform, the lines $a_1$ and $a_2$ are curved, while the line $i$ remains rectilinear.

While in Figures 1 to 3 I have shown a device suitable for use in measuring forces or weights, I wish it to be understood that my invention is not limited to such use.

In Figures 5 to 7 is shown a modified device suitable for a controlling system, such as a system for steering a ship or an aircraft, the system being used for adjusting the rudder 32 of the craft, the setting mechanism being controlled by a gyroscope 30. The rudder is operated by means of a direct current motor 33, a shaft 34 and a worm gearing 35. The field winding of the motor is connected by leads 36 and 37 with a source of electric current 38, and current is supplied to the armature of the motor by means of leads 39. The gyroscope 30 includes a rotary body 41 which is mounted in an annular frame 42 pivotally mounted in an annular frame 43, and the said frame 43 is pivotally mounted by means of a vertical axle 44 in a frame (not shown) fixed to the craft. To the frame 43 a contact 46 is secured which slides on a resistance 47.

The controlling movement of the gyroscope is transmitted to the motor 33 by means of a relay 48 which includes a control device according to the present invention.

The said control device comprises a permanent magnet 50 between whose poles N and S a stationary soft iron core 51 is located, the said core being fixed to a plate 58 secured to the magnet 50. Concentrically of the said core three electromagnet coils 52, 53 and 54 are mounted with their sides located in annular gaps 55 provided between the poles N, S and the core 51. The said coils are mounted on a common carrier 56 which is pivotally mounted at 56 and 57 on the core 51. Concentrically spaced from the coils 52, 53 and 54 are segmental resistance coils 59 and 60 are mounted on carriers 61 and 62. To the coils 52, 53, 54 arms 63 and 64 are secured which carry thin contact springs 65 and 66 sliding on the resistance coils 59 and 60.

In the present embodiment the coil 52 is the one which moves relative to the coils 53 and 54. The coil 52 is connected with fixed terminals 68, the connection being made so that the rotary movement of the coil is not interfered with, one of the said terminals being connected by a lead 67 with the contact spring 65. The terminals of the coils 53 and 54 are connected with contacts 70 and 71, respectively, the said contacts 68, 70 and 71 being mounted on a bracket 69 rising from the magnet 50.

The resistances 59 and 60 are included in a circuit 72, 73 including a source of electrical energy 74, the said resistances being connected in shunt.

One of the contacts 68 which is connected with one of the terminals of the coil 52 has a lead 48 connected thereto, which includes a regulatable resistance 75 and a connection with one of the motor armature leads at a point between the motor and the contactor 66.

The terminals 70 of the coil 53 are connected by leads 76 and 77, respectively with the gyroscope contact 46 carried by the frame 43 and a contact 78 located at the middle of the resistance 47, and the lead 77 includes a regulatable resistance 79 located between the coil 53 and the tap 78.

The rudder 32 has an arm 80 carrying a contact 81 sliding on a wire resistance 82, and the contact 81 is connected by a lead 83 including a regulatable resistance 84 with one of the terminals 71 of the coil 54, and the other terminal 71 of the said coil is connected by a lead 85 with the middle of the resistance wire 82.

The operation of the steering system is as follows:

Normally, that is when the craft is at the desired course, the rudder 32 is in the position shown in Fig. 7 in which the arm 81 engages the coil 82 at its middle. The contact 46 of the frame 43 likewise engages the resistance wire 47 at its middle. The coils 53 and 54 are adapted to be energized by current from the source 38. But in the median or initial positions of the contact arm 81 and the frame 43 no current is supplied to the coils, because the terminals of the coils have the same potential and the coils 52, 53, 54 are held in the median or initial position shown in Figure 7. However, any displacement of the coils from the initial position produces energization of the coil 52, and the cooperating magnetic fields thus produced return the set of coils into median or initial position.

When the craft leaves the desired course the contact 46 slides on the resistance 47 either to the right or left by the well known action of the gyroscope. Thereby a potential difference is produced between the contacts 46 and 78, so that the coil 53 is energized for turning the set of coils 52, 53, 54 clockwise or counterclockwise, according to the change of the course of the craft. Thus, the contacts 65 and 66 are shifted on the resistance coils 59 and 60 clockwise or counterclockwise. Assuming the coils to have been turned clockwise, the current flows from the battery 74 through the right hand portion of the circuit 73, the right hand portion of the resistance coil 59, one of the terminals 68 of the coil 52, the coil 52, the second terminal 68 of the coil 52, the resistance 75, the contact spring 66, the left hand portion of the resistance 60, and the battery 74. Thus a magnetic field is produced by the coil 52 which limits the movement of the set of coils to a point at which the forces resulting from the fields of the coils 53 and 52 are in equilibrium, and which tends to return the set of coils 52, 53 and 54 into initial position. From the terminals 68 current flows through the leads 39 and the armature of the motor 33, whereby the said motor and rudder 32 are turned in one or the other direction, according to the direction of the displacement of the contact 46 and the contact spring 65. Thus the rudder is turned in a direction for returning the craft into the selected course. It will be understood that the coil 53 counteracts the coil 52 so that up to this point in the operation the coil 52 is not able to return the set of coils into initial position.

However, as the rudder 32 is moved to correct the course the contact 81 shifts along, the resistance 82, and thereby a potential difference is produced between the contact 81 and the lead 85, so that the coil 54 then becomes energized. The coils 53 and 54 are wound so that at every change of the course fields are produced in the said coils which counteract each other. As a consequence, when the rudder is adjusted in the manner just described the magnetic field produced by the coil 54 counteracts the field produced by the coil 53, and, finally, an equilibrium of the fields of the coils 53 and 54 is established, so that the coil 52 is able to return the set of coils into the median position, in which the motor 33 is stopped. Further, the energization of the coil 53 is gradually reduced as the craft returns toward its normal course and the contact 46 moves towards its median position.

As a result of the drop in energization of the coil 53, the force created by the magnetic field of the coil 54 exceeds that created by the field of the coil 53, so that the set of coils is further turned beyond its initial position and in a direction for supplying current from the contacts 65 and 66 to the motor 33 for starting the same in a direction opposite from that in which it has before been operated, that is in a direction for setting the rudder into median position, and this return movement begins before the craft has assumed its normal course. By the return movement of the rudder the coil 54 is deenergized, and the coil 52 finally returns the set of coils into median position.

All the parts are regulated so that the rudder arrives in initial position when the rudder arrives on its normal course. Such regulation is made by means of the resistances 75, 79 and 84 included respectively in the circuits of the coils 52, 53 and 54.

As has been stated above the coils 53 and 54 are arranged so that the fields produced thereby act in opposition to each other. The angular displacement of the rudder 32 depends on the angular displacement of the frame 43 relatively to the resistance 47 and the deviation of the craft from the desired course. Therefore, the more the craft is brought out of course the larger is the angular displacement of the rudder.

In the device shown in Figs. 1 to 3, a single resistance coil 13 is provided for cooperation with the spring contact 12, while in the modification shown in Figs. 5 to 7 two resistances 59 and 60 are provided, the resistance 59 replacing the resistance 23 shown in Figs. 1 to 3. But I wish it to be understood that, as far as the device shown in Figs. 5 to 7 is concerned, my invention is not limited to the use of two resistances 59 and 60 cooperating with the slide contacts 65 and 66 controlled by the coils 52 to 54. But I prefer to provide two such resistances for the reason that thereby a stronger current is supplied to the motor 33.

While in the construction shown in Figs. 1 to 3 the entire current flowing through the contact spring 12 and the resistance winding 13 flows through the ammeter 24, in the modification shown in Figs. 5 to 7 the corresponding current flowing through the contact springs 65 and 66 is divided into two parts, one flowing through the coil 52, and the other being supplied to the armature of the electric motor 33. I prefer the construction shown in Figs. 5 to 7, for the reason that the current energizing the coil 52 and providing the directing moment of the device is independent of the load on the relay, that is, in the example shown, of the load of the motor 33, because the said current energizing the coil 52 does not pass through the electric motor. On the other hand the current flowing to the motor 33 depends only on the angular displacement of the coils 52, 53 and 54, and it is independent of the resistance 75. Therefore, the said resistance 75 has merely the function to regulate the sensitiveness of the system.

In the device shown in Figs. 5 to 7 the uniformity of the winding of the resistance coils 59 and 60 is not critical, because the slide contacts 65 and 66 will always find points on the resistance wires 59 and 60 where the potential difference is zero, and which define the neutral position of the system. Further, with a definite total number of ampere windings of the coils 53 and 54, the initial voltage between the contact springs 65 and 66 is dependent only on the resistance 75, and it is independent of the resistances 59 and 60 and the accurate winding thereof.

In the construction shown in Figs. 5 to 7 the electrical connection of the device is made substantially in the form of a Wheatstone system. In Fig. 8 I have shown a modification in which a compensating connection of another type is provided. The construction of the relay is the same as that described with reference to Figs. 5 to 7, and the same reference characters have been used to indicate corresponding parts. Therefore, the construction and the electrical circuit will be understood though various parts such as the electric motor, the rudder and the gyroscope have been entirely omitted or represented only by some of their parts. Between the poles N and S of the permanent magnet 50 the coils 53 and 54 and a coil 92 are mounted on a common carrier, and the contact 66 slides on the resistance 59. The coil 53 is included in a circuit 76, 77 with the resistance 47 and the slidable contact 46 controlled by the gyroscope (not shown), and the said circuit includes the regulatable resistance 79. The coil 54 is connected by the leads 83, 85 with the resistance 82, the contact 81 sliding thereon, and the regulatable resistance 84. In lieu of the coil 62 shown in Figs. 5 to 7 the coil 92 is provided. The terminals of the said coil are connected by leads 93 with the ends of the resistance 59. The middle of the coil 92 is connected by a lead 95 with the contact 65, and the said lead includes the battery 94 which has the function of the battery 74. The circuit 39 of the armature winding of the electric motor 33 is connected to the end terminals of the resistance 59.

In the median position of the slide contact 65 the potential difference at the ends of the resistance 59 is zero, and no current is supplied to the motor 33. But when the said contact has been shifted on the resistance to the right or left, the said potential difference is either positive or negative, and accordingly the motor 33 is operated for turning the rudder to the right or left.

The operation of the system is as follows:

In the normal position of the parts shown in Fig. 8 the contact 65 engages the resistance 59 at its middle, and therefore currents of equal intensity flow from the contact 65 through both branches of the resistance 39 and through the upper and lower branches of the coil 92. The total number of ampere windings of the coil 92 is zero, and therefore the said coil does not generate a magnetic field. If, however, the set of coils 92, 53 and 54 is turned clockwise or anticlockwise in the manner described with reference to Figs. 5 to 7, the contact 65 is shifted on the resistance wire 59 to the right or left, and thereby the currents flowing through the upper and lower branches of the coil 92 are different, and therefore the said coil produces a magnetic field. The windings and other connections are such that the magnetic field thus produced tends to return the set of coils into the zero position shown in the figure, whether the set of coils is turned clockwise or anticlockwise.

The function of the coils 53 and 54 and the parts connected therewith is the same as that of the corresponding parts shown in Figs. 5 to 7. Therefore the operation of the whole system will be understood without further explanation.

I claim:

1. An electromagnetic control device comprising a displaceable element, means affording a first magnetic field and a conductor positioned in said field adapted when energized by electric current to produce a second magnetic field, said means and conductor being movable relatively to each other by the action of the magnetic force resulting from said fields, a source of electrical energy, current regulating means controlled by the relative movement of said means and said conductor, a circuit including said conductor, said source and said regulating means in such such a way that when said conductor and said means are moved relatively to each other away from normal position said second magnetic field and said first field react upon said elctromagnetic device to cause said electromagnetic device to return said displaceable element into normal position, and means for displacing said displaceable element out of normal position.

2. In an electrical apparatus as defined in claim 1, the further improvement described herein, which consists in the said current regulating means comprising a resistance and a contact slidable thereon, said resistance and contact being movable relatively to each other in accordance with the relative movement of said means to generate a magnetic field and said conductor.

3. The electromagnetic control device as defined in claim 1, wherein the last mentioned means comprises a second conductor movable in the first magnetic field so as to generate a third magnetic field, said second conductor being mechanically connected with the said first-named conductor for moving the same out of normal position.

4. In an electrical apparatus as defined in claim 1, the further improvement described herein, which consists in the said current regulating means comprising two contacts and two resistances arranged in shunt, said contacts and resistances being connected respectively with said means affording said first magnetic field and the first mentioned conductor.

5. In an electrical apparatus as defined in claim 1, the further improvement described herein, which consists in hand operated means to regulate the current flowing through said first mentioned conductor.

6. In an electrical apparatus as defined in claim 1, the further improvement described herein, which consists in the said circuit being in the form of a balancing connection in which the first mentioned conductor and said current regulating means are arranged so that in the normal position of the said displaceable element the magnetic force resulting from the means affording said first magnetic field and second magnetic field is zero.

7. In an electrical apparatus as defined in claim 1, the further improvement described herein, which consists in the said current regulating means being in the form of a resistance and a contact operatively connected respectively with said means affording the first magnetic field and the first mentioned conductor, and in which the said circuit is in the form of a Wheatstone bridge the diagonal of which includes said first mentioned conductor and said contact, and the branches of which include said resistance.

8. In an electrical apparatus as defined in claim 1, the further improvement described herein, which consists in the said regulating means including a resistance and a contact operatively connected respectively with said means affording the first a magnetic field and the first mentioned conductor, said contact being located in the zero position at a point intermediate the ends of said resistance, and in which the said circuit including said conductor, said source of current, said resistance and said contact is connected so that the force resulting from said magnetic fields upon movement of said contact relatively to the resistance in either direction tends to return said displaceable element into normal position.

9. In an electrical apparatus as defined in claim 1, the further improvement described herein, which consists in said means affording the first magnetic field being in the form of a permanent magnet, and the first mentioned conductor being in the form of an electric coil movable in the air gap of said magnet.

10. In an electric device as defined in claim 1, the further improvement described herein, which consists in a regulatable resistance included in the circuit connected with the first mentioned conductor.

11. In an electrical device as defined in claim 1, the further improvement described herein, which consists in a hand and scale marks cooperating with said electromagnetic device for indicating the relative displacement thereof.

12. In an electrical device as defined in claim 1, the further improvement described herein, which consists in an electric meter connected with first mentioned conductor.

13. In an apparatus as defined in claim 1, the further improvement described herein, which consists in said means for moving said displaceable element out of normal position comprising a lever operatively connected with said electromagnetic device and adapted to have a force to be measured applied thereto.

14. In an electrical controlling system, a controlling device adapted to be operated by electric current, an electromagnetic device including first means affording a first magnetic field and a first conductor in said field adapted when energized by electric current to produce a second magnetic field, said means and said first conductor being movable relatively to each other by the action of the magnetic force resulting from said fields, electrical means operated by said relative movement for actuating said controlling device, a source of electric current, current regulating means controlled by the relative movement of said means and said first conductor, and a circuit including said first conductor, said source, and said regulating means in such a way that when said first conductor and said means are moved relatively to each other from normal position a magnetic field is generated tending to return said first means and said first conductor and the regulating means controlled thereby into normal positions.

15. In an electrical controlling system as defined in claim 14, the further improvement described herein, which consists in the said current regulating means comprising a resistance and a contact slidable thereon, said resistance and contact being movable relatively to each other in accordance with the relative movement of said means affording said first magnetic field and said conductor.

16. An electrical controlling system for controlling an electrically operated device comprising an electromagnetic device including means affording a magnetic field and a first conductor movably mounted in said field and adapted when energized by electric current to produce a second magnetic field, said means and said first conductor being movable relatively to each other by the action of the magnetic force resulting from said fields, a source of electric current, two contacts and two resistances engaged thereby and connected in shunt, said contacts and resistances being movable relatively to each other in accordance with the relative movement of said means and said first conductor, and a circuit including said first conductor, source of electric current, said resistance and said contacts and arranged so that the field produced by the current flowing through first conductor tends to move said means and said first conductor into their initial positions, means for moving them into and out of their normal positions, and an operative electrical connection between said contacts and said electrically operated device.

17. A controlling system, comprising an apparatus to be controlled including a controlling device adapted to be operated by electric current, an electromagnetic device including means to generate a magnetic field and a conductor in said field adapted when energized by electric current to produce a magnetic field, said means and conductor being movable relatively to each other by the action of the magnetic force resulting from said fields, a source of electric energy, a resistance and a contact in engagement therewith, said resistance and contact being operatively connected with said electromagnetic device for being moved relatively to each other in accordance with the relative movement of said conductor and said means to generate an electric field, and a circuit including said conductor, source, resistance and contact in such a way that the field produced by the current flowing through said conductor tends to move said electromagnetic device into an initial position, a circuit including said source, contact and said controlling device of said apparatus to be controlled and connected in shunt with said conductor, and means adapted to move said electromagnetic device out of normal position.

18. An electrical system comprising an electromagnetic device including means to generate a magnetic field and a conductor in said field adapted when energized by electric current to produce a magnetic field, said means and conductor being movable relatively to each other by the action of the magnetic force resulting from said fields, a source of electric energy, two resistances, two contacts respectively slidable thereon and normally engaging said resistances at points intermediate the ends thereof, said contacts and resistances being operatively connected respectively with said means to generate a magnetic field and said conductor for being moved relatively to each other in accordance with the relative movement of said means to generate a magnetic field and said conductor, and a circuit including said source, resistances and contacts and connected so that upon movement of said electromagnetic device from normal position the current flowing through said conductor tends to return said electromagnetic device into initial position, an apparatus to be controlled including a controlling device operated by electric current, said controlling device being connected with said contacts in shunt with said conductor, a second electric conductor bodily connected with said first-named conductor and located in the field of said means to generate a magnetic field and adapted when energized by current to move said first-named conductor, and means to supply electric current to said second conductor.

19. In a steering system for a craft, said system being adapted to maintain the craft on a predetermined course, said system comprising a directional device adapted to maintain its direction when the craft deviates from its course, a circuit including a first source of electric current and means controlled by said directional device for regulating the current supplied from said source to said circuit, electrically operated steering means on said craft, an electrical apparatus connected between said directional device and said electrically operated steering means and comprising an electromagnetic device including first means affording a first magnetic field and a conductor in said field adapted when energized by electric current to produce a second magnetic field, said first means and said conductor being movable relatively to each other by the action of the magnetic force resulting from said fields, a second source of electric current, resistances and cooperating contacts connected in shunt with second source of current, the said contacts normally engaging points intermediate the ends of said resistances, said resistances and contacts being mechanically connected respectively with said first means and said conductor so as to adjusted to positions corresponding to the relative displacements of said first means and said conductor, and an electric circuit including said second source of electric current, said resistances, said contacts, and said conductor in such a way that when said conductor and said first means are moved relatively to each other from normal position a current of increased intensity flows through said conductor tending to return said first means and said conductor and said resistances and said contact into normal relative positions, a second conductor mounted in the field generated by said first means and mechanically connected with said electromagnetic device and electrically connected with said means controlled by said directional device and adapted to move said electromagnetic device out of normal position, and a circuit connecting the contacts of said electromagnetic device with said electrically operated steering means.

20. In a steering system as defined in claim 19, the further improvement which consists in a third conductor located in the magnetic field of said electromagnetic device and mechanically connected with said first named conductor, and a resistance and contact controlled by said steering means and electrically connected with said third conductor so as to supply current thereto for causing the said third conductor to move said electromagnetic device in a direction opposite to that imparted thereto by said directional device.

21. In a steering system for a craft comprising steering means for said craft, electrically controlled operating means for said steering means, a directional member mounted on said craft and adapted to maintain its direction when the craft changes its direction, a resistance and contact controlled by said member in accordance with the change of the direction of the craft, and a circuit including a source of electric current connected with said resistance and said contact, the improvement which consists in a relay between said directional member and said steering means and comprising an electromagnetic device including first means affording a magnetic field, a first conductor and a second conductor mechanically connected with each other and both movable in said field said first and second conductors tending when energized by electric current to produce magnetic fields to turn relatively to said first means, a resistance and a contact slidable on said resistance and normally engaging the same at a point intermediate its ends, a source of electric current, a first circuit including said resistance, said contact, said first conductor, and said source of electric current in a manner to cause return of said electromagnetic device into normal position when the circuit is closed, a second circuit connecting said first contact, said source of electric current, and said electrically controlled operating means for said steering means, and a third circuit connecting said second conductor with said resistance and said contact controlled by said directional member.

22. In a system as defined in claim 21, the further improvement which consists in a third conductor located in the said field of said electromagnetic device and mechanically connected with said first and second conductors, a resistance and a contact controlled by said steering means, a source of electric current, and a circuit including the last-named source of electric current, said resistance and said contact controlled by said steering means and said third conductor, whereby said electromagnetic device tends to move in a direction opposite to the displacement imparted thereto by said second conductor.

ALBERT PATIN.